United States Patent [19]

McPherson et al.

[11] Patent Number: 4,620,112
[45] Date of Patent: Oct. 28, 1986

[54] CHIRP SIGNAL GATING CIRCUIT FOR EXPANDER IN A PULSE COMPRESSION RADAR SYSTEM

[75] Inventors: Hugh McPherson, Tweeddale; John P. Blakely, Edinburgh, both of Scotland

[73] Assignee: FERRANTI plc, Cheshire, England

[21] Appl. No.: 539,559

[22] Filed: Oct. 6, 1983

[30] Foreign Application Priority Data

Oct. 16, 1982 [GB] United Kingdom ............... 8229618

[51] Int. Cl.[4] ..................... H03K 17/56; H03K 17/29; H03K 21/09
[52] U.S. Cl. ................................ 307/239; 307/247 R; 307/597; 377/55; 377/114
[58] Field of Search ................... 307/247 R, 592, 597, 307/518, 239; 377/51, 52, 56, 118, 119; 343/17.2 PC; 377/47, 112, 114

[56] References Cited

U.S. PATENT DOCUMENTS

| 2,405,597 | 8/1946 | Miller ................................. 377/119 |
| 3,018,440 | 1/1962 | Cumings ........................... 377/119 |
| 4,090,133 | 5/1978 | Klyce et al. ......................... 377/51 |
| 4,165,458 | 8/1979 | Koizumi et al. ..................... 377/52 |

FOREIGN PATENT DOCUMENTS 1149150  4/1969  United Kingdom .
1379836  1/1975  United Kingdom .

Primary Examiner—Stanley D. Miller
Assistant Examiner—Timothy P. Callahan
Attorney, Agent, or Firm—Kerkam, Stowell, Kondracki & Clarke

[57] ABSTRACT

A gating arrangement for a pulse compression circuit includes a surface acoustic wave delay line SAW responsive to an input pulse to generate a frequency-modulated radio-frequency output signal which is applied to an output gate OG. The output signal is also applied to circuit means DC operable to produce a digital pulse corresponding to each cycle of the output signal. The pulses are counted by a counter CT and applied to control means CM. This responds to first and second predetermined counter states to control the operation of the output gate OG.

4 Claims, 1 Drawing Figure

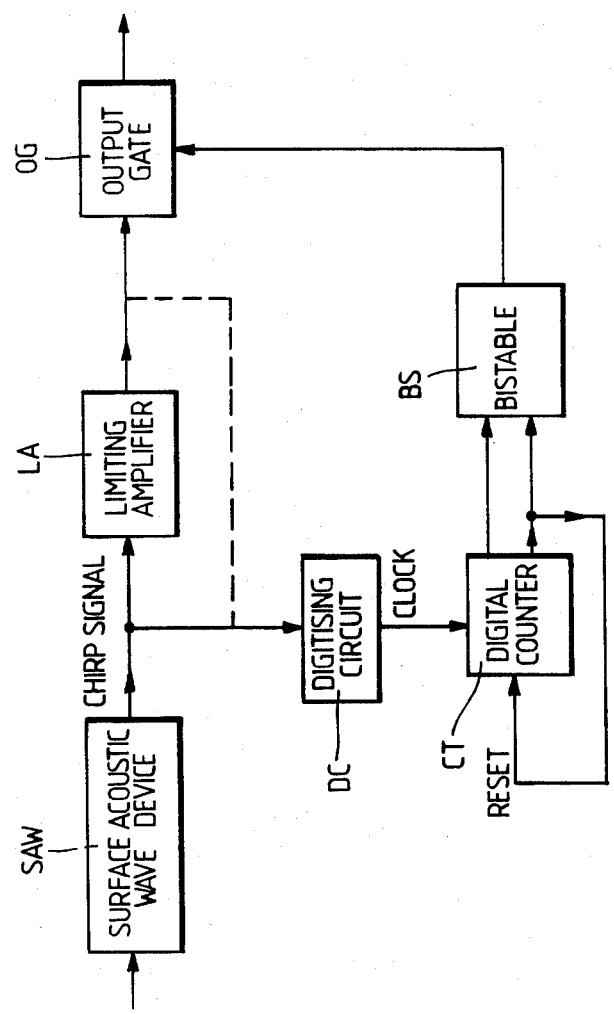

CHIRP SIGNAL GATING CIRCUIT FOR EXPANDER IN A PULSE COMPRESSION RADAR SYSTEM

This invention relates to pulse compression circuits, and in particular to circuits for use with linear or non-linear frequency-modulated or "chirp" radar Systems.

In modern chirp radar systems the transmitted signal is a long frequency-modulated pulse or "chirp" frequently produced by a surface acoustic wave or "SAW" device known as an "expander". On reception the received pulse is compressed by a further SAW device in the form of a dispersive delay line having amplitude and phase responses matching those of the transmitted pulse, and known as a "compressor".

The chirp signal is generated by exciting the expander with a short duration impulse, preferably consisting of several cycles of radio-frequency energy at the centre frequency of the expander.

SAW devices are commonly of two types. One is the inter-digital device often made on a quartz or lithium niobate substrate, whilst the other is the reflective array compressor type, usually made only on lithium niobate. When used as expanders, both types of device suffer from the problem that there is a build-up and fall-off time associated with the output, representing a portion of the output signal which cannot be used. In addition, these devices are temperature sensitive, particularly those made of lithium niobate. Hence although the number of pulses in the outpt signal remains constant as determined by the design of the device, the time taken to generate this signal may vary. It is therefore not possible simply to gate the signal for a fixed period of time in order to remove the unwanted build-up and decay portions of the chirp signal. However, it is necessary to remove these unwanted portions, and it is an object of the invention to provide a gating arrangement for a pulse compression circuit which achieves this requirement.

According to the present invention there is provided a gating arrangement for a pulse compression circuit which includes a surface acoustic wave delay line responsive to an input pulse to generate a frequency-modulated radio-frequency output signal, a gate to which said output signal is applied, circuit means responsive to the output to generate a digital pulse corresponding to each cycle of said output signal, a counter operable to count said digital pulses, and control means responsive to first and second predetermined counter states to control the operation of said gate.

An embodiment of the invention will now be described with reference to the accompanying drawing, which shows a schematic block diagram of a circuit.

Referring now to the drawing, a surface acoustic wave expander SAW has an input to which a suitable exciting input may be applied. The input is preferably a signal comprising several cycles at the centre frequency of the expander. The output of the expander SAW will be a frequency-modulated radio frequency signal, commonly called a "chirp" signal. This is applied to a limiting amplifier LA which limits the amplitude of the signal, and then to an output gate OG.

The output of the expander SAW, or alternatively that of the limiting amplifier LA, is applied to a digitising circuit DC, which delivers a pulse train having a separate pulse corresponding to each cycle of the chirp signal. The pulses are applied to the clock input of a digital counter CT, which therefore counts the pulse applied to it. As stated above the output gate OG is required to be opened after a first number of cycles of the chirp signal and closed after a second number of cycles. The appropriate two states of the counter CT denoting these numbers are therefore detected, and employed to set and reset a bistable circuit BS which controls the operation of the output gate. The second counter state which closes the output gate also resets the counter in preparation for the next chirp signal.

The circuit described above is a simple circuit which may be improved in a number of ways. For example the digitising circuit DC may include a threshold device to remove spurious pulses from the chirp signal. Similarly, the means for detecting the occurrence of the first and second states of the counter CT may include digital comparators operable to provide an output when the appropriate count is reached. A monostable circuit may be included in the gate control signal path to provide fine timing adjustment.

What we claim is:

1. A gating circuit for an expander in a pulse compression radar system which includes a surface acoustic wave delay line responsive to an input pulse to generate a frequency-modulated radio-frequency output signal, said gating circuit comprising:
    a gate having an input to which the output signal from the delay line is applied;
    means responsive to the output signal from the delay line for generating a digital pulse corresponding to each cycle of the output signal;
    a digital counter operable to count the digital pulses and hvaing at least first and second predetermined counter states; and
    control means connected to said digital counter and to said gate, said control means being responsive to the first predetermined counter state to open said gate, and responsive to the second predetermined counter state to close said gate.

2. A gating circuit in accordance with claim 1, which further comprises a limiting amplifier connected between the delay line and said gate, and operable to limit the amplitude of the delay line output signal applied to said gate.

3. A gating circuit in accordance with claim 1, wherein said means responsive to the output signal from the delay line for generating digital pulses includes a threshold device operable to pass only those parts of the output signal which exceed a preset threshold level.

4. A gating circuit in accordance with claim 1, wherein said control means includes a bistable device having two states, said bistable device having an output connected to said gate to open said gate in one of the states of said bistable device and to close said gate in the other of the states of said bistable device, and having a pair of inputs responsive to the first and second predetermined states of said counter for selecting the state of said bistable device.

* * * * *